(12) United States Patent
Crow

(10) Patent No.: US 6,589,630 B1
(45) Date of Patent: *Jul. 8, 2003

(54) PERFORMANCE ENHANCING SHOE COMPONENTS AND METHODS

(76) Inventor: William R. Crow, 2910 N. 175 E., Provo, UT (US) 84604

( * ) Notice: Subject to any disclaimer, the term of this patent is extended or adjusted under 35 U.S.C. 154(b) by 75 days.

This patent is subject to a terminal disclaimer.

(21) Appl. No.: 09/602,350

(22) Filed: Jun. 23, 2000

Related U.S. Application Data

(63) Continuation-in-part of application No. 09/130,786, filed on Aug. 7, 1998, now Pat. No. 6,120,880, which is a continuation-in-part of application No. 08/939,782, filed on Sep. 29, 1997, now abandoned, which is a continuation-in-part of application No. 08/616,323, filed on Mar. 15, 1996, now Pat. No. 5,695,850, which is a continuation-in-part of application No. 08/409,023, filed on Mar. 23, 1995, now Pat. No. 5,554,694.

(60) Provisional application No. 60/140,665, filed on Jun. 23, 1999.

(51) Int. Cl.$^7$ .......................... A43B 13/18; A43B 13/38; A43B 5/00
(52) U.S. Cl. ........................... 428/167; 428/156; 36/44; 36/43; 36/24; 36/28; 36/29; 36/27; 36/32 R; 36/35 R; 601/28; 482/14; 482/15; 482/74; 482/79; 525/236; 525/237
(58) Field of Search ................................. 428/167, 156; 36/44, 43, 24, 28, 29, 27, 32 R, 35 R; 525/236, 237; 482/14, 15, 74, 79; 601/27

(56) References Cited

U.S. PATENT DOCUMENTS

| 3,060,989 A | 10/1962 | Railsback |
| 3,087,262 A | 4/1963 | Russell |
| 3,166,609 A | 1/1965 | Wilder |
| 3,589,036 A | 6/1971 | Hendricks |
| 3,696,062 A | 10/1972 | Lesage |
| 3,724,107 A | 4/1973 | Makinen |

(List continued on next page.)

FOREIGN PATENT DOCUMENTS

| GB | 2032761 A | 5/1980 |
| JP | 928648 | 6/1963 |
| JP | 53-17661 | 2/1978 |
| JP | 57-30737 | 2/1982 |
| JP | 57025340 | 2/1982 |
| JP | 774351 | 7/1995 |

OTHER PUBLICATIONS

ASTM D945–92 Test Specifications.
ASTM D–2632–92 Test Specification (partial).
Dynamic Mechanical Tests, Rubber Technology, pp. 134–138.
Linatex Rubber Sheets Product Literature.
Firestone Product Literature Diene Rubber for Impact Modification of Plastics.
Firstone Product Literature Diene Rubber for Extrusion Grade Impact Polystyrene.
Firestone Product Literature Diene 55AC.
Firestone Product Literature Storge and Handling of Plastic Grade Diene Polybutadiene Rubber.
Firestone Product Literature Firestone Diene 600, 635, 645, 660.
European Search Report for EP–98118389.

*Primary Examiner*—William P. Watkins, III

(57) ABSTRACT

The present invention provides performance enhancing shoe components and methods of using those shoe components to increase exercise performance. The shoe components comprise a layer of 1,4-polybutadiene and, optionally, a high energy returning rubber. A second layer of an energy returning rubber and/or a coating is optionally applied to the first layer. The invented shoe components may be formed as shoe inserts, insoles, midsoles, soles, or portions thereof.

21 Claims, 7 Drawing Sheets

U.S. PATENT DOCUMENTS

| | | |
|---|---|---|
| 3,940,145 A | 2/1976 | Gentiluomo |
| 3,965,055 A | 6/1976 | Shichman et al. |
| 4,006,542 A | 2/1977 | Larson |
| 4,049,595 A | 9/1977 | Dominguez |
| 4,119,588 A | 10/1978 | Carpino |
| 4,219,945 A | 9/1980 | Rudy |
| 4,253,252 A | 3/1981 | Eisenberg |
| 4,366,630 A | 1/1983 | Bloom |
| 4,418,483 A | 12/1983 | Fujita |
| 4,502,234 A | 3/1985 | Schaefer |
| 4,510,699 A | 4/1985 | Nakamura |
| 4,672,754 A | 6/1987 | Ehrlich |
| 4,674,204 A | 6/1987 | Sullivan |
| 4,843,735 A | 7/1989 | Nakanishi |
| 4,887,367 A | 12/1989 | Mackness et al. |
| 4,894,933 A | 1/1990 | Tonkel et al. |
| 4,904,725 A | 2/1990 | Himes |
| 4,910,886 A | 3/1990 | Sullivan |
| 4,918,841 A | 4/1990 | Turner et al. |
| 4,956,405 A | 9/1990 | Wheeler et al. |
| 4,970,807 A | 11/1990 | Anderie et al. |
| 4,972,611 A | 11/1990 | Swartz |
| 5,038,500 A | 8/1991 | Nicholson |
| 5,053,438 A | 10/1991 | Kozma |
| 5,084,987 A | 2/1992 | Flemming |
| 5,147,589 A | 9/1992 | Chang |
| 5,185,203 A | 2/1993 | Itaba |
| 5,203,793 A | 4/1993 | Lyden |
| 5,288,446 A | 2/1994 | Noyama |
| 5,304,326 A | 4/1994 | Goto |
| 5,311,674 A | 5/1994 | Santiyanont |
| 5,362,435 A | 11/1994 | Volpe |
| 5,554,694 A * | 9/1996 | Crow .................... 36/43 |
| 5,695,850 A * | 12/1997 | Crow .................... 36/44 |
| 6,120,880 A * | 9/2000 | Crow .................... 36/24 |

* cited by examiner

PERFORMANCE ENHANCING SHOE COMPONENTS AND METHODS

RELATED APPLICATIONS

This application is a continuation-in-part of U.S. patent application Ser. No. 09/130,786, filed Aug. 7, 1998, now U.S. Pat. No. 6,120,880, which is a continuation-in-part of U.S. patent application Ser. No. 08/939,782, filed Sep. 29, 1997 now abandoned, which is a continuation-in-part of U.S. application Ser. No. 08/616,323, filed Mar. 15, 1996, now U.S. Pat. No. 5,695,850, which is a continuation-in-part of U.S. patent application Ser. No. 08/409,023, filed Mar. 23, 1995, now U.S. Pat. No. 5,554,694, and this application Ser. No. 09/602,350 further claims the benefit of U.S. Provisional Application Ser. No. 60/140,665, filed Jun. 23, 1999, each of which is incorporated by reference herein.

BACKGROUND OF THE INVENTION

The design of athletic shoes is becoming increasing important to the performance of athletes. As athletic events become more competitive, small improvements in performance become increasingly significant. Athletic shoes that enhance the performance of athletes by only a few tenths or hundredths of a second, or a fraction of a centimeter, can provide the "winning edge" sought by athletes. For this reason, athletes are constantly seeking shoes that improves their performance.

Many features have been added to athletic shoes to increase athletic performance. Most such improvements have been made in the physical and structural composition of the interior and exterior elements of soles of athletic shoes. Other improvements include increasing the amount of cushioning or shock absorption to prevent injury to the wearer. Such improvements are often made at the expense of energy return, so that the shoe may actually decrease athletic performance.

The material most frequently used for insoles in athletic shoes is ethylene vinyl acetate ("EVA"). EVA is a lightweight, inexpensive, sponge-like material that does not provide significant energy return to the wearer. Examples of shoe insoles made from EVA are disclosed in a U.S. patent to Fujita et al. (U.S. Pat. No. 4,418,483), which is incorporated herein by reference. This patent teaches making shoe midsoles by combining EVA with a styrene-butadiene rubber. While such midsoles have excellent cushioning properties, they do not enhance athletic performance by providing significant energy return to the user. Rather, the cushioning effect of EVA reduces performance by absorbing energy.

Fujita et al. also disclose a shoe soles or midsoles of 1,4-polybutadiene with other rubbers, such a 1,2-polybutadiene. These other rubbers do not provide substantial energy return, and can actually reduce energy return provided by the 1,4-polybutadiene. For example, in its cured state, 1,2-polybutadiene is a hard material which lacks the ability to be compressed and rebound to provide energy return. In its uncured state, 1,2-polybutadiene (syndiotactic) exhibits mild elastomeric properties. When high energy return rubbers such as 1,4-polybutadiene rubber are combined with 1,2-polybutadiene, the 1,2-polybutadiene typically controls the characteristics of the resulting composition and reduces its energy return. Similarly, Fujita et al. teach the inclusion of fillers such as hard clay and silica, which also reduce the energy return of the shoes.

A U.S. patent to S. P. Chang and R. I. Chang (U.S. Pat. No. 5,147,589), which is incorporated herein by reference, discloses a method of making shoe soles of a polymer blend which is a mixture of rubbers including thermoplastic elastomers, styrene-butadiene rubber, acrylonitrile-butadiene rubber, and plastics such as polystyrene, EVA, or polyvinyl chloride. When high energy return rubbers such as 1,4-polybutadiene are incorporated into such shoe soles, the high energy return rubbers compose only a small weight percentage of the total rubber in the shoe, and, therefore, the shoes do not provide substantial energy return. Chang et al. also teach the inclusion of non-energy returning materials ("fillers"), including white hard clay, white carbon VN-3 filler, carbonates and silica. These materials modify some characteristics of the soles, such as durability or strength, of the shoe part, but also decrease energy return A U.S. patent to T. Noyama and A. Nakahara (U.S. Pat. No. 5,288,446) discloses a process for imparting strength to rubber articles. This patent is incorporated by reference herein. Noyama et al. teach enhanced strength by adding fillers such as metal salts of alpha, beta-unsaturated fatty acids, nylon and calcium carbonate. Such fillers harden the rubber article and improve its strength at the expense of energy return. Because such hardened compositions are less compressible, they can also injure the user.

A U.S. patent to Sullivan et al. (U.S. Pat. No. 4,910,886) discloses a shoe insert for total shock absorption, but not for energy return. This patent is incorporated by reference herein. The innersole of Sullivan et aL contains predominant amounts of a substantially non-deformable, expandable polymer, such as elastomeric urethane. Such materials are not known for providing energy return or for improving athletic performance.

While the energy return of 1,4-polybutadiene, in the form of super balls, for example, is known, those of ordinary skill in the shoe art have not looked to shoe components made of 1,4-polybutadiene and other high energy return rubbers to improve athletic performance. The manufacturers of athletic shoes have failed to appreciate that significant energy return is available from shoe components of 1,4-polybutadiene alone or in combination with another high energy return rubbers such as natural rubber, synthetic isoprene rubber, polyisoprene, butadiene acrylonitrile rubber or ethylenepropylene diene modified rubber.

SUMMARY OF THE INVENTION

The present invention provides a shoe component comprising 1,4-polybutadiene. The 1,4-polybutadiene can be combined with other high energy return rubbers, such as natural rubber, synthetic isoprene rubber, polyisoprene, butadiene acrylonitrile rubber or ethylenepropylene diene modified rubber. The shoe component is typically substantially free of fillers that reduce the energy return of the component. The shoe component is preferably placed in a shoe between the user's foot and the shoe sole. Thus, the shoe component can be, for example, an insole, midsole, or shoe insert, or a portion of an insole, midsole or shoe insert. The shoe component is compatible with use in a wide variety of shoes, including, but not limited to, athletic shoes, dress shoes, casual shoes, walking shoes, sandals, and the like. The shoe components can also be shaped to fit a variety of shoes and can be positioned within the sole, at the midsole, at the insole, or on top of the insole.

Methods of making and using the invented shoe components are also provided. In one embodiment, when the shoe component is inserted into an athletic shoe, the shoe component can increase the ability of the wearer to leap forward, jump upward, and/or run faster, and the like. Suitable activities (e.g., exercises) in which performance is improved include walking, running, weight lifting, broad jumping, high jumping, volleyball, basketball, football, soccer, and the like. In another embodiment, the shoe component increases the wearer's strength. In still another embodiment, the shoe component improves the performance of the wearer's heart, such as by reducing fibrillation. In yet another embodiment, the shoe component provides a resilient, high energy return material that reduces injury.

DETAILED DESCRIPTION OF THE PREFERRED EMBODIMENTS

Figure 1:
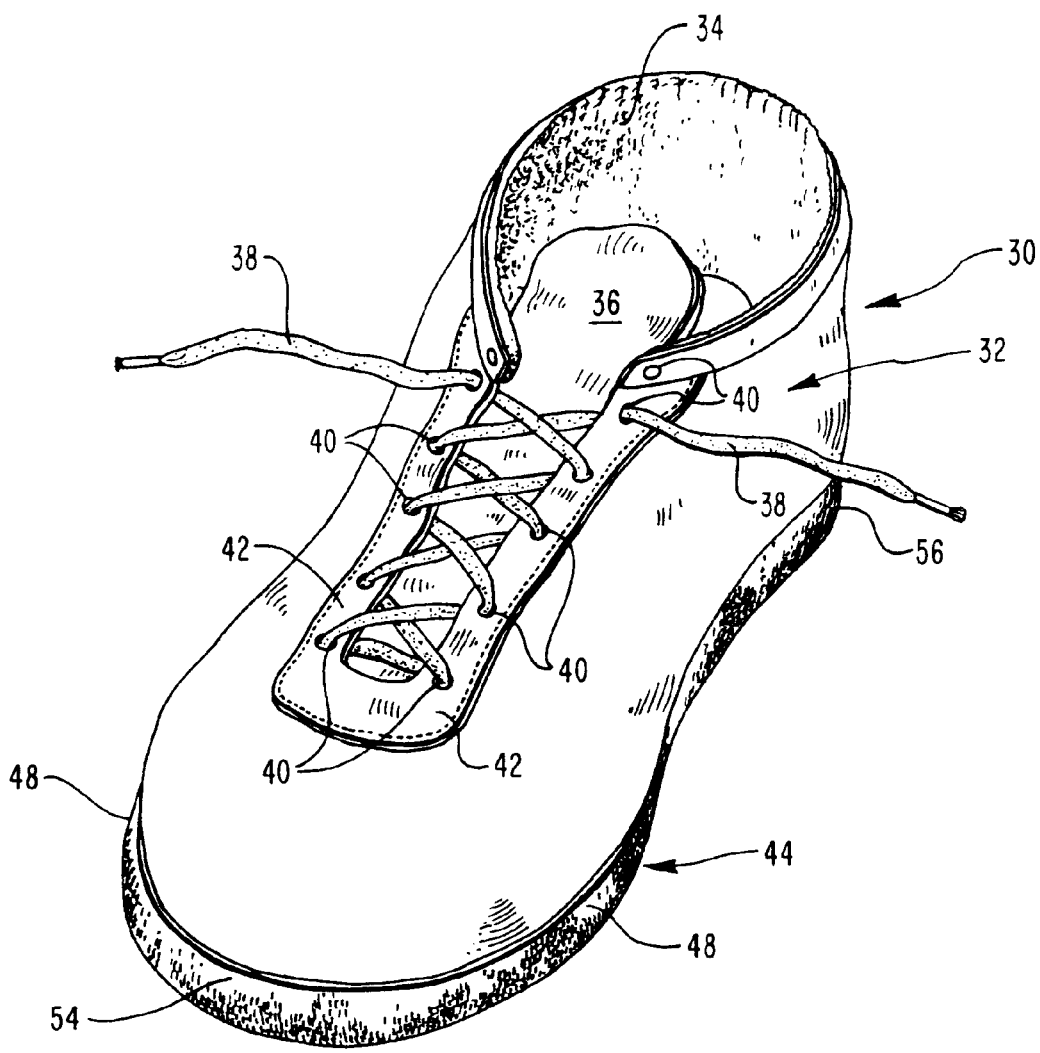
FIG. 1 is a perspective of an athletic shoe.

In a preferred embodiment, the shoe component is an insole, a portion of an insole, a midsole, portion of a shoe midsole, or a shoe insert. In another embodiment, the shoe component is a sole or a portion of a shoe sole. The shoe component is typically shaped for placement in a shoe. As used herein, the term "performance enhancing" means that the shoe component permits the wearer to jump higher, leap farther, run faster, take longer strides, and the like. The term "performance-enhancing" also includes increasing the wearer's strength and/or decreasing heart fibrillation's.

The shoe component typically comprises a mixture of 1,4-polybutadiene and a high-energy return rubber. In another embodiment, the shoe component consists of 100% 1,4-polybutadiene rubber. As used herein, the term "1,4-polybutadiene" refers to a 1,4-polybutadiene having a cis content of at least about 90%. More typically, the 1,4-polybutadiene has a cis content of at least about 95%, which is also referred to hereafter as "high-cis 1,4-polybutadiene." In a preferred embodiment, the 1,4-polybutadiene has a cis content of at least about 98%, which is also referred to hereafter as "very high-cis 1,4-polybutadiene."

The 1,4-polybutadiene is typically combined with a high-energy return rubber such as natural rubber, synthetic isoprene rubber, polyisoprene, butadiene acrylonitrile rubber and/or ethylenepropylene diene modified rubber. These rubbers provide substantial energy return in combination with the 1,4-polybutadiene. In one embodiment, the high energy return rubber is natural rubber, such as standard Malaysian rubber, Grade 5.

Methods of preparing and determining the cis content of 1,4-polybutadiene, and of making cured mixes of 1,4-polybutadiene with other rubbers, are well known to the skilled artisan. Such methods are disclosed in the *Kirk-Othmer Encyclopedia of Chemical Technology* (4th Edition), which is incorporated herein by reference.

Typically, the 1,4-polybutadiene/rubber blends comprises 1,4-polybutadiene within the range of about 46 to about 100 weight percent, and rubber within the range of about 54 to about 0 weight percent, based on the total weight of the 1,4-polybutadiene and the rubber. In another embodiment, the amount of 1,4-polybutadiene is from about 50 to about 95 weight percent, and the amount of rubber is from about 50 to about 5 weight percent, based on the total weight of the 1,4-polybutadiene and the rubber. In another embodiment, the amount of 1,4-polybutadiene is from about 65 to about 85 weight percent, and the amount of rubber is from about 35 to about 15 weight percent, based on the total weight of the 1,4-polybutadiene and the rubber. Alternatively, the proportion of 1,4-polybutadiene is from about 95 to about 100 weight percent, and the amount of rubber is from about 5 to about 0 weight percent.

Exemplary embodiments include those presented in Table 1. Generally, as the percentage of the 1,4-polybutadiene increases with respect to the rubber, energy return increases and durability and tensile strength decrease.

Referring to Table 1, Example 1 is a substantially solid shoe insole of about 46 weight percent 1,4-polybutadiene and about 54 weight percent polyisoprene, which provides energy return as well as shock absorption. A foam insole (Example 2) will include equal parts of 1,4-polybutadiene and butadiene acrylonitrile rubber. Such a shoe insole can be used by a wearer seeking a comfortable insole that provides energy return. Shoe midsoles and insoles that provide energy return include cured mixes of high-cis 1,4-polybutadiene and rubber are shown in Examples 3, 5, 7, 9 and 10. Examples of shoe insoles and midsoles made of a cured mix of very high-cis 1,4-polybutadiene and natural rubber are shown in Examples 11–14.

A foam insole providing energy return (Example 4) includes about 75 weight percent 1,4-polybutadiene and about 25 weight percent synthetic isoprene. In another embodiment, the shoe component includes a foam midsole with about 95 weight percent 1,4-polybutadiene and about 5 weight percent of a rubber such as natural rubber (Example 6). A substantially solid insole can comprise about 60 weight percent of high cis or very high-cis 1,4-polybutadiene and about 40 weight percent natural rubber (Examples 8 and 11).

In other preferred embodiments, the 1,4-polybutadiene can include other materials, such as stabilizing agents. Such a 1,4-polybutadiene can include FIRESTONE DIENE 55NFA or FIRESTONE DIENE 55AC10, which typically have a cis content of about 90%. Alternatively, the 1,4-polybutadiene can be a high-cis 1,4-polybutadiene, such as FIRESTONE DIENE 600, 635, 645 or 660, which have a typical analysis of about 95% cis content. In another embodiment, the 1,4-polybutadiene is very high-cis 1,4-polybutadiene, such as Goodyear BUDENE 1207 or 1208; another suitable rubber is KBR01, which is about 95–98% cis.

The 1,4-polybutadiene is typically combined with a high energy return rubber, such as natural rubber, synthetic isoprene rubber, polyisoprene, butadiene acrylonitrile rubber and ethylenepropylene diene modified rubber to form a pre-mix. The pre-mix is then cross-linked to form a cured mix, hereafter referred to as a "1,4-polybutadiene/rubber composition." To accomplish this, well known additives are introduced into the pre-mix. Specifically, activating, accelerating, and/or curing agents are introduced as part of the pre-mix, as will be discussed in more detail below.

In another embodiment, a foaming agent is included in the pre-mix to form a foam composition containing entrapped gas. The type and use of such foaming agents are known to the skilled artisan. The amount of foaming agent can include any effective amount of foaming agent sufficient to form a foam 1,4-polybutadiene/rubber composition. Such an effective amount can range from about 0.1 to at least about 20 weight percent, based on the weight of 1,4-polybutadiene and rubber. In another embodiment, the cured mixture is formed by omitting a foaming agent, resulting in a substantially solid composition. Agents such as activation, acceleration and/or curative agents can be used in the preparation of either a foam or substantially solid 1,4-polybutadiene/rubber composition.

Reference is now made to the drawings wherein like numerals are used to designate like parts throughout and which illustrate various forms and embodiments of the present invention, as are currently preferred. For the following discussion, the term "1,4-polybutadiene/rubber composition" refers to a composition comprising 1,4-polybutadiene alone (e.g., 100% polybutadiene) or in combination with a high energy return rubber FIG. 1 illustrates a typical athletic shoe, generally designated 30, which is intended to exemplify any conventional shoe (athletic or otherwise) equipped with an embodiment, according to the present invention. Shoe 30 comprises a conventional upper portion, generally designated 32, which comprises a foot-receiving interior 34, a tongue 36, laces 38, and lace-receiving apertures 40 disposed in opposed, spaced, reinforced bands 42 located at the arch of the shoe. Shoe 30 also comprises a sole, generally designated 44. Sole 44 is connected to upper shoe portion 32 at lap interface 46 in any desired conventional way, such as by heat fusion, adhesive bonding and/or stitching. Sole 44 is illustrated as comprising vertical side surfaces 48 and a bottom tread surface 50. The sole 44 is illustrated as spanning from the toe 54 to the heel 56 of the shoe and is configurated along side surfaces 48.

Figure 2:
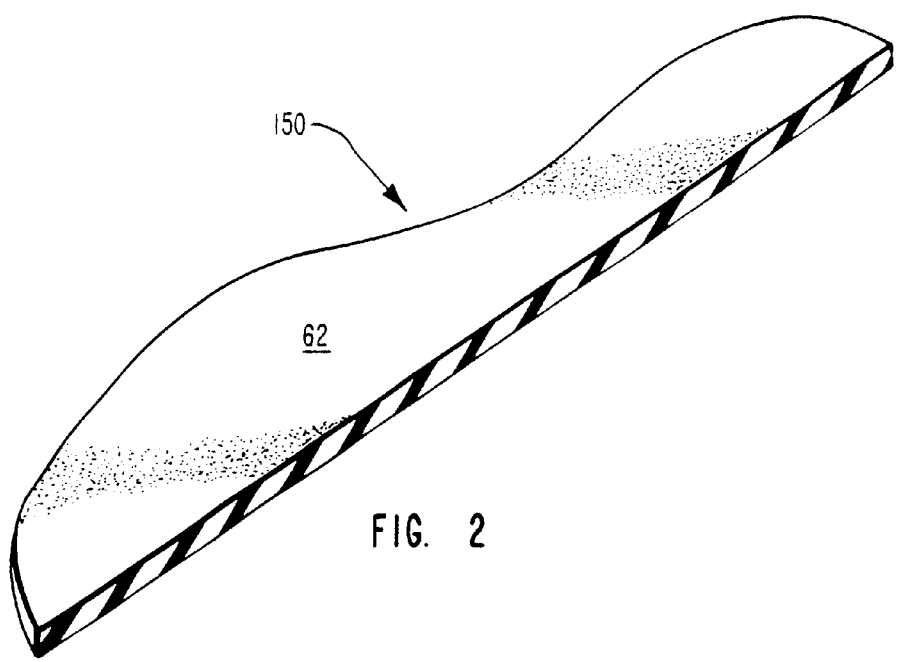
FIG. 2 is an enlarged fragmentary perspective shown partly in cross-section of an insole.

Referring to FIG. 2, in one embodiment, the 1,4-polybutadiene/rubber composition is an insole layer 150 within a shoe 30. The insole layer typically runs the full length of the shoe and is shaped for placement within the shoe. The insole 150 is illustrated as being of uniform thickness throughout its entire length and comprises a top surface 62 and a bottom surface 64. The insole can also be less than a full insole, for placement at any desired location, such as at the ball region or the heel region, for example. The 1,4-polybutadiene/rubber composition can also form a midsole layer, or a portion thereof, or a shoe insert in shoe 30.

The thickness of a single layered 1,4-polybutadiene/rubber composition typically ranges from about 1/32" to about 1/2", although greater and lesser thickness' are also within the scope of the invention. In another embodiment, a single layered composition range in thickness from about 1/16" to about 1/4", and can be about 5/64–7/64." In another embodiment, it is important for the wearer to nearly or completely compress the 1,4-polybutadiene/rubber composition and then to allow the composition to expand or rebound to its original thickness to provide energy return to the wearer. Therefore, the thickness of the shoe component can also be determined according to the weight and strength of the wearer.

Figure 3:
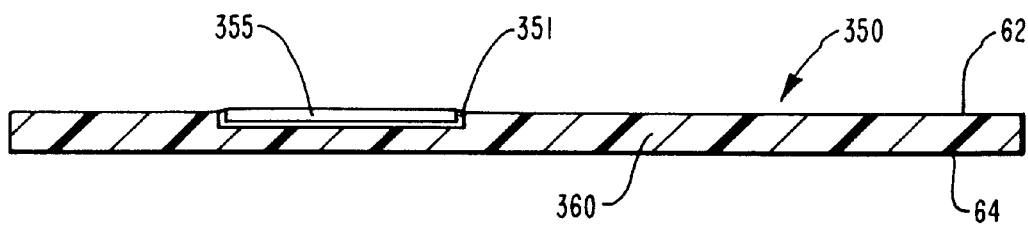
FIG. 3 is a cross-section of a full length insole, midsole or shoe insert having an energy enhancing insert.

Referring to FIG. 3, in another embodiment, the 1,4-polybutadiene/rubber composition is combined with a larger pad 360 to form a shoe insole, midsole or shoe insert 350. The pad is preferably also an energy return material such as 1,4-polybutadiene, neoprene, natural rubber, polyisoprene, styrene butadiene, foamed urethane, an EVA/natural rubber mixture, or a mixture of any of these. For EVA/natural rubber pads, the amount of EVA typically ranges from about 25 to about 75 weight percent, and the amount of natural rubber typically ranges from about 75 to about 25 weight percent, where the weights percentages are based on the total amount of EVA and natural rubber. For a natural rubber pad 360, a preferred natural rubber is LINATEX 95% natural rubber (Linatex, Inc., Phoenix, Ariz.), a low-temperature cured rubber, although other brands of natural rubber can be used.

In a more preferred embodiment, the 1,4-polybutadiene/rubber composition 355 is a pad that is superimposed on a layer of another energy returning rubber, such as neoprene (e.g., RUBATEX 8536; Rubatex, Longbeach, Calif.), 1,4-polybutadiene, natural rubber, polyisoprene, styrene butadiene, foamed urethane, an EVA/natural rubber mixture, or a mixture of any of these, so that the 1,4-polybutadiene/rubber composition is positioned under the ball of the wearer's foot.

In another embodiment, the 1,4-polybutadiene/rubber composition 355 is inserted into channel 351 in the pad 360. Channel 351 is preferably formed by cutting a channel with an abrasive sanding disc, although other methods of forming the channel are possible. Channel 351 is typically about 3½ inches wide, 1/32 inches deep and centered under the ball of the ball of the foot. Channel 351 can be formed in the top or bottom of pad 360. The area in which the pad will be placed can also be compressed prior to forming channel 351. The pad can be compressed by any suitable compression means including, but not limited to, a hydraulic press. The pad is typically compressed to between about 15 to 90 tons for about 2–3 seconds, although shorter or longer compression times are within the scope of the invention. The pad can also be compressed to between about 15 to 45 tons, typically about 30 tons (about 8500 psi) of pressure. Such compression prior to forming channel 351 further increases the energy return of the 1,4-polybutadiene/rubber multilayer composition. If the energy return of the combination is tested by dropping a heavy round object, such as a super-heavy basketball (about 5 pounds), on the pad from a height of about 7 feet, an increase in energy return of about 6–8% is observed as compared with an uncompressed pad.

Figure 4:
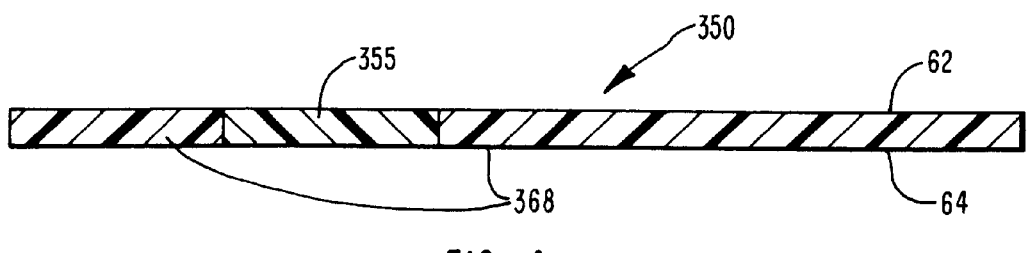
FIG. 4 is a cross-section of another full length insole, midsole or shoe insert having an energy enhancing insert.

The 1,4-polybutadiene/rubber composition can be attached to the other layer by any suitable attachment mechanism, including but not limited to, heat fusion and gluing. Referring to FIG. 4, the 1,4-polybutadiene/rubber composition 355 can also be attached between sections of high energy return material 368. For example, the 1,4-polybutadiene/rubber composition 355 can be attached to neoprene sections 368 by any suitable attachment mechanism, including but not limited to, heat fusion and gluing.

Figure 5:
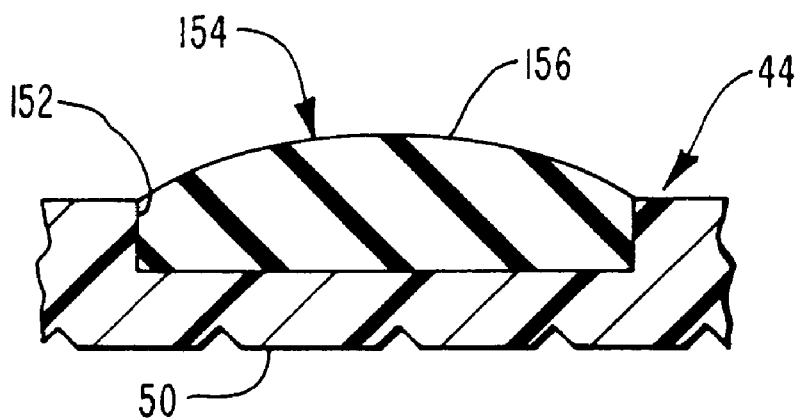
FIG. 5 is a enlarged fragmentary cross-section of a midsole element inserted into a cavity in a shoe sole.

Referring to FIG. 5, the shoe component can also be a sole insert. For example, the tread portion 44' of an athletic shoe 30 is illustrated in FIG. 5 as having a rectangular recess 152 disposed at the upper surface thereof. A sole insert 154 of a 1,4-polybutadiene/rubber composition is illustrated as placed into the recess 152 so that the edges thereof are flush with the top surface of the tread portion 44 while the arched center 156 of the sole insert protrudes above the tread portion towards the wearer's foot. Other configurations can be used, such as, for example, a flat or convex sole segment for insert 154. The sole insert 154 can be disposed in the interior of the shoe at any desired location, such as at the ball region, the heel region or the arch region, for example. Furthermore, either in a localized or comprehensive way, embodiments wherein a portion thereof is within a shoe at the sole region and/or a portion is exposed to the exterior of the shoe are also within the scope of the present invention.

When the 1,4-polybutadiene/rubber composition is disposed in the bottom of a shoe sole, the composition is preferably coated with a thin, abrasion-resistant material that prevents wearing away of the 1,4-polybutadiene/rubber composition. Such abrasion resistant materials can include, for example, a thin layer of 1,2-polybutadiene.

Figure 6:
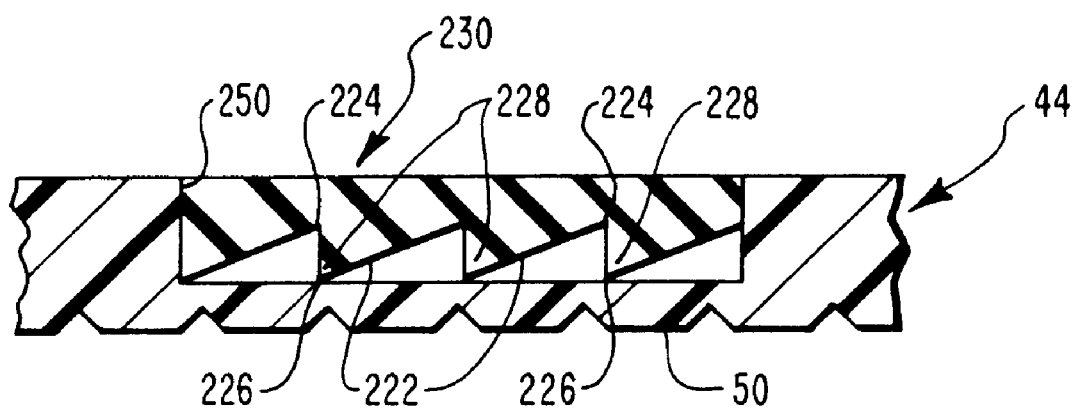
FIG. 6 is an enlarged fragmentary cross-section of another midsole insert.

Referring to FIG. 6, sole 44 of the shoe 30 can be fashioned so as to comprise an internal recess 250. The described insert 230 can be installed within the recess 250 either with the serrations up or down, as desired, the serrations being illustrated as disposed in a downward direction in FIG. 6. The insert 230 is secured by heat fusion, adhesive material or in any other suitable way within the recess 250 and may be so secured so as to be removable and replaceable with a new sole segment. A spacer material, if desired, can be juxtaposed with the serrated surface 222, or not used at all, as illustrated in FIG. 6.

In another embodiment, the 1,4-polybutadiene/rubber composition has surface texturing. Such texturing is desirable to prevent slippage of the composition in a shoe, to promote adhesion between layers, and/or to provide additional energy return. Such texturing can be formed, for example, during a calendering process. Such surface texturing can also include corrugations, ripples, wrinkles or folds. Such corrugations both prevent the composition from slipping in the shoe and also provide additional energy return and shock absorption. When a force is applied to such a composition, the corrugations compress or flatten, thereby absorbing energy. When the force released, the corrugations spring back to their original shape, providing additional mechanical energy in addition to the resilient energy inherently provided by the 1,4-polybutadiene/rubber composition. When the 1,4-polybutadiene/rubber composition includes additional layers or coating, the surface texturing is preferably included in the additional layers or coating. Such surface texturing can be formed in the manufacturing process. For example, if the material is loosely wrapped during the calendering process, corrugations will form. Surface texturing can also be formed in the 1,4-polybutadiene/rubber composition using a mold and press.

Figure 7:
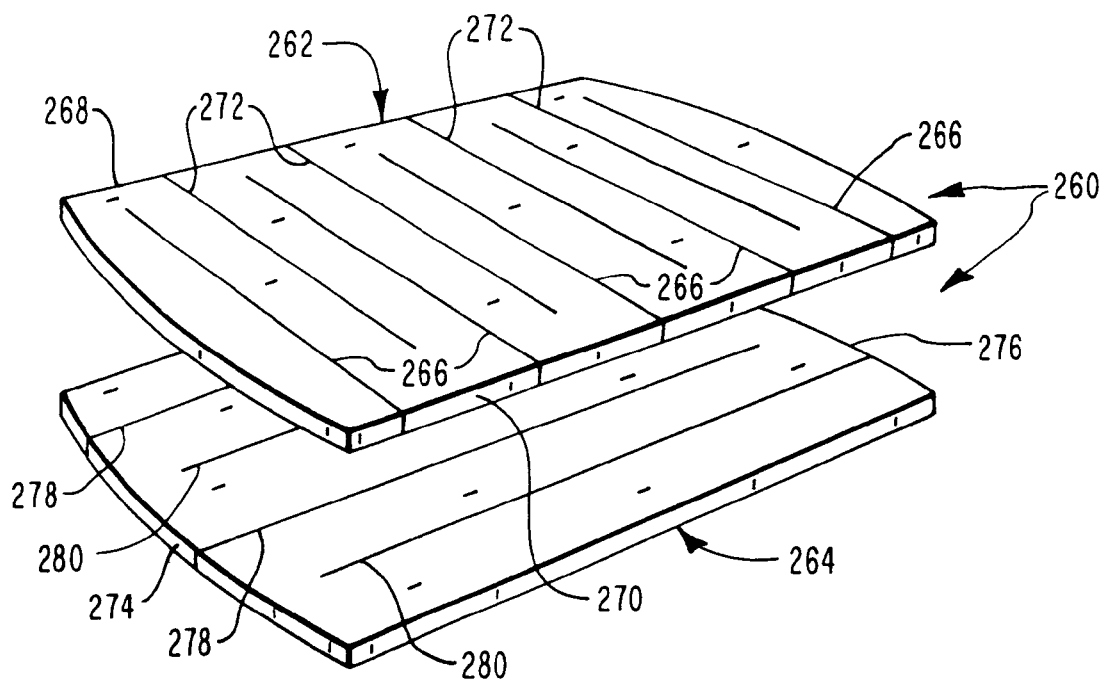
FIG. 7 is an exploded perspective of two separate, superimposed shoe components comprising slits for expansion under compression.

Referring to FIG. 7, a bi-layer insole portion, generally designated 260, can be fashioned in accordance with the present invention. The insole portion 260 comprises a top layer 262 and bottom layer 264, each comprising one of the above-described 1,4-polybutadiene/rubber compositions. In use, layers 262 and 264 are intended to be vertically superimposed and contiguous one with the other and to be placed beneath either or both the ball or heel of a foot of a user within the interior of a shoe. The layers 262 and 264 can be placed either above an existing insole layer or within a recess internally disposed within the shoe having a suitable thickness to accommodate receipt of layers 262 and 264.

Layer 262 is illustrated as comprising longitudinally directed fingers cut in the material after it is formed and cured. These fingers are formed by a plurality of alternate slits 266 which extend from a location slightly spaced from the front edge 268 to intersect the rear edge 270. Similarly, at locations mid-distant between slits 266 are disposed additional longitudinally directed slits 272, which begin at a location slightly forward of the rear edge 270 and extend in a forwardly direction terminating at forward edge 268.

The slits 266 and 272 form a series of opposed rearwardly and forwardly extending fingers such that when subjected to weight and the force of walking or running under the ball or heel of the user's foot will accommodate yawning, spreading or separation of the fingers at the slits 266 and 272 to enhance energy return in a desired direction. Similarly, insole segment layer 264 comprises a blunt left side edge 274 and a blunt right side edge 276 (as viewed in FIG. 7). Transfer slits 278 extend from edge 274 to a location in each case spaced a short distance from edge 276. Similarly, transverse slits 280 extend entirely through layer 264 and run from edge 276 to a location spaced a short distance from edge 274. Just as slits 266 and 272 in partial insole layer 262 yawn, spread or expand transversely to improve energy return, so too do slits 278 and 280 yawn, spread or expand under weight and force in a longitudinal direction to similarly improve energy return or rebound of the bi-layer insole segment 260.

Figure 8:
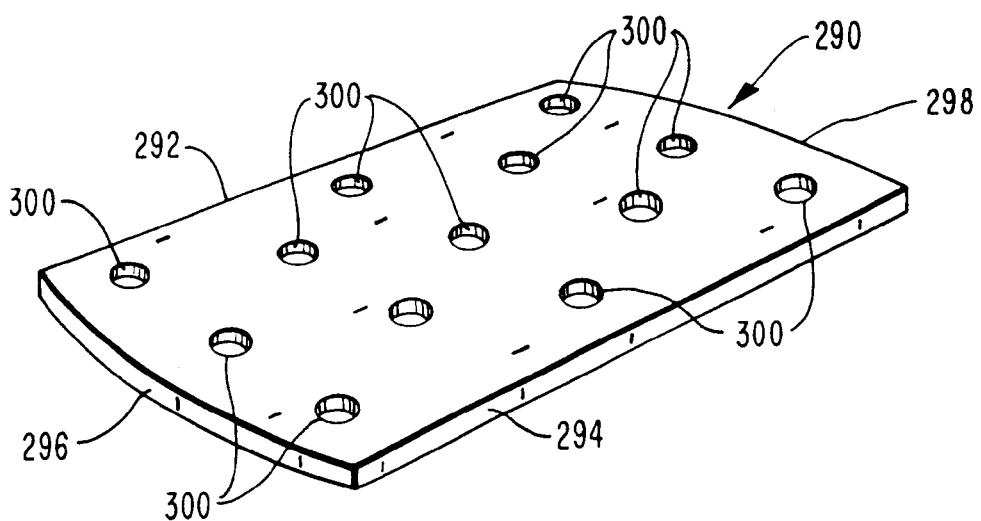
FIG. 8 is a perspective of a shoe component having perforations.

Reference is now made specifically to FIG. 8, which illustrates still another insole segment, generally designated 290, formed in accordance with the principles of the present invention. Insole segment 290 is illustrated as comprising front and back blunt edges 292 and 294 as well as curved left and right side edges 296 and 298, so that the insole segment 290 can be placed beneath the heel and/or ball of the foot of the user in a shoe for improved energy return in a desired direction, such as at an angle to both the horizontal and the vertical. The increase in energy return not only improves performance (e.g., the distance one can jump), but adds an increment of quickness to each step or stride of the user.

The insole segment 290 comprises a plurality of perforations or apertures 300, which allow any shoe portion disposed below the insole segment 290 to breathe and which also provides room for the material comprising the insole segment 290 to expand or spread under the weight and force of the user during walking and running. By providing space in the form of perforations 300 for the flattening of the insert segment 290, the energy return is enhanced.

Figure 9:
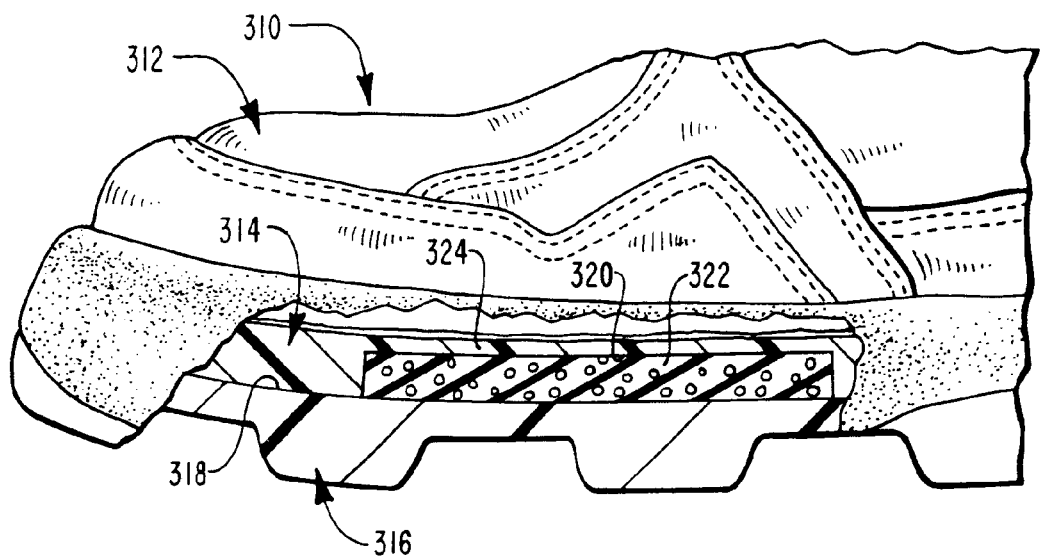
FIG. 9 is a fragmentary side elevation partly in cross-section showing a midsole element.

Reference is now made to FIG. 9 which illustrates still a further embodiment. In this embodiment, shoe 310 comprises a shoe upper 312, an interior insole 314, and a tread layer 316. Above the top surface 318 of the exposed tread layer 316, adjacent the ball receptacle of the shoe 310, is disposed a lower recess 320 in the midsole 314. A sole segment 322 is disposed within the recess 320 and is, therefore, spaced from the sock and shoe of the user. Segment 322 can be substantially rectangular in configuration and is illustrated as having a uniform thickness throughout. Segment 322 can also have any other suitable configuration and thickness, according to the desired use and placement of the segment within the midsole. The segment 322 typically fills the lower cavity 320 in the midsole layer 314. The segment 322 is illustrated as comprising one of the above-described foam 1,4-polybutadiene/rubber compositions, although segment 322 can also be formed of a substantially solid 1,4-polybutadiene/rubber composition.

The configuration illustrated in FIG. 9 is such that the midsole layer 314, and particularly that reduced thickness portion 324 of midsole 314 disposed immediately above the insole segment 322, is preferably relatively stiff. The midsole layer, therefore, tends to maintain its flat configuration and function as a bearing plate when the weight of the user and the force of the wear's foot in walking and/or running are imposed thereon to compress the layer 322. When the exposed tread sole 316 is also relatively stiff and resistant to material indentation, it functions also as a bearing plate whereby the layer 322 is compressed between two relatively stiff bearing plates. As the weight and force of the user's step or stride is lifted, it has been found that the energy return of the layer 322 against the foot of the user enhances stride and lift. While the configuration of the layer 322 is illustrated in FIG. 9 as being placed at the ball of the foot of the user, it is to be appreciated that it could be extended beyond the ball of the foot and/or placed under the heel of the user or under both the ball and heel of the foot of the user.

Figure 10:
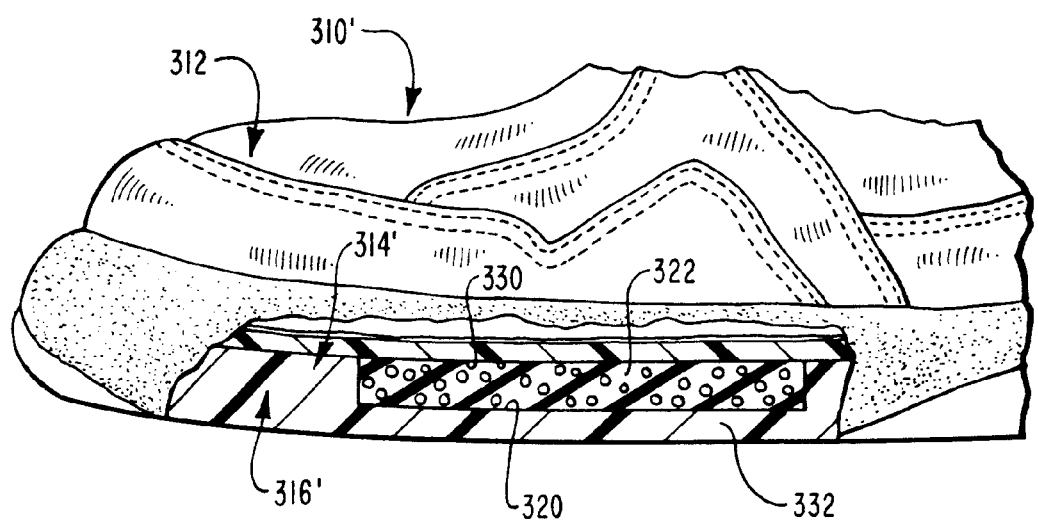
FIG. 10 is another fragmentary side elevation partly in cross-section showing a midsole element.

Reference is now made to FIG. 10 which illustrates an additional embodiment, generally designated 310'. Shoe 310' includes upper shoe portion 312, a relatively thin insole layer 314' and a sole 316'. The insole 314' is illustrated as being of uniform thickness throughout and without any recess or cavity disposed therein. In other embodiments, the thickness of insole 314' could be varied according to the desired use and performance enhancement. The exposed sole 316' can comprise a generally rectangular shaped cavity 320' disposed between the bottom surface 330 of the insole 314'. The thickness of the cavity 320' is illustrated as being uniform and slightly greater than one-half the depth of the sole 316' both forward and rearward of the cavity 320'. The thickness of cavity 320' can also be varied according to the desired use and performance enhancement. The layer 322, described above in connection with FIG. 9, is illustrated as being disposed within cavity 320' and serves to function in the same fashion described above when interposed between a stiff plate-like insole 314' and a reduced thickness sole layer 322 so that the 1,4-polybutadiene/rubber composition of layer 322 is essentially sandwiched between two stiff plates. Thus, as force due to weight, walking and/or running is cyclically applied and removed by the foot of the user to the top plate, i.e., stiff insole 314', the layer 322 is compressed and recoils between layers 332 and 314'. Thus, when the force and weight are lifted by the wearer, the recoil effect of the layer 322 is imposed in a somewhat uniform way across the entire ball, or other part of the foot, and provides energy return.

Figure 11:
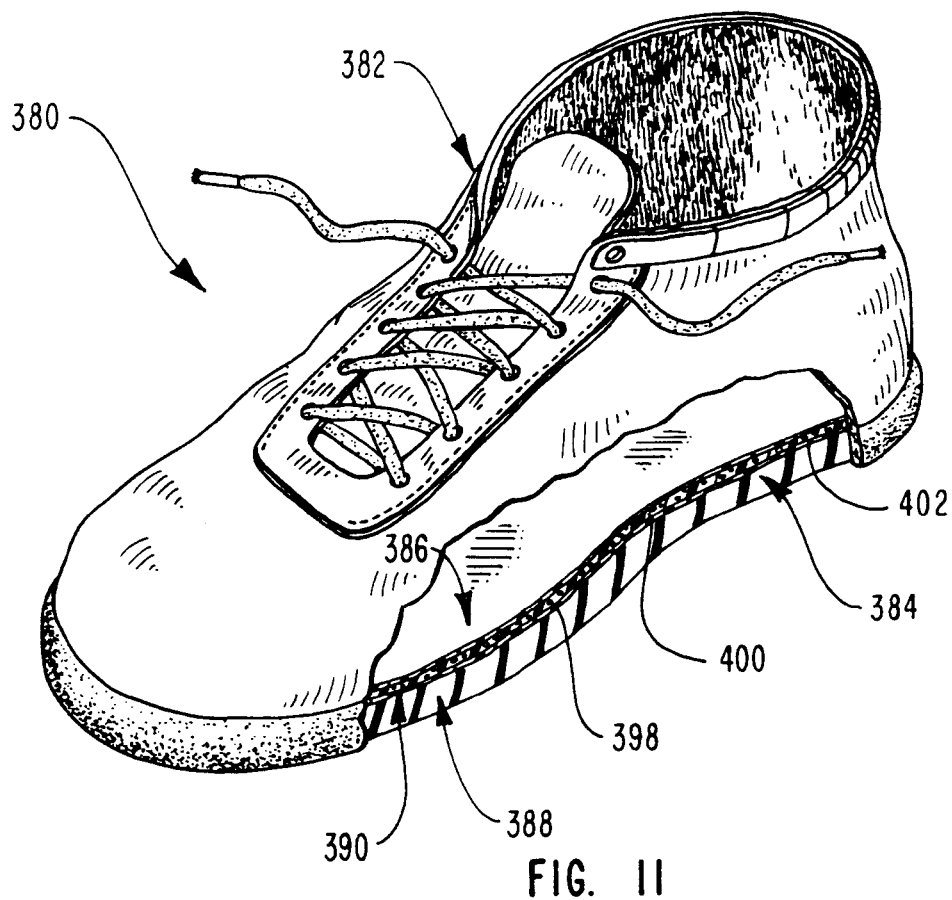
FIG. 11 is a side elevation partly in cross section of an insole or shoe insert.
Figure 12:
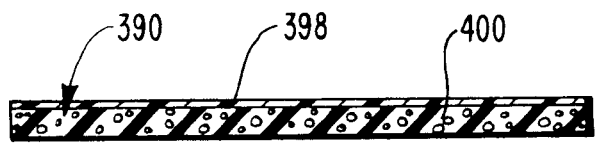
FIG. 12 is a cross section of a shoe component having an upper layer.

FIGS. 11 and 12 illustrate a shoe 380 comprising an upper portion 382, and a sole portion, generally designated 384. Sole 384 comprises a midsole or insole layer 390 and a bottom sole 388. Insole or midsole 390 is a lamination comprising two layers of foot-supporting materials, top layer 398 and a bottom layer 400. Top layer 398 is preferably a thin layer or coating of a resilient or semi-rigid material on the top surface of the 1,4-poly-butadiene/rubber composition 400, hereafter referred to as a "coating". The coating serves to provide more uniform compression of the underlying layer 400, especially at the region underneath the ball of the foot. Referring to FIG. 12, when the toes exert a force on an area of coating 398, coating 398 is transmits at least a portion of that force to a greater surface area of layer 400, which underlies coating 398. Through this action, coating 398 facilitates compression of a larger area of layer 400 than is compressed by the wearer's toes. Coating 398 also aids in compressing underlying pad 400 more quickly to provide faster rebounding action.

The coating can be, for example, natural rubber, neoprene, styrene butadiene rubber or polyurethane. Natural rubber is preferred because it has more tensile strength than the 1,4-poly-butadiene/rubber composition, and thereby provides more tensile strength to the entire composition. The preferred natural rubber is a high durometer rubber with good tensile strength. The coating thickness can range from about 1/64" to about 3/32", although greater and less thickness' are possible. In one embodiment, the coating thickness is about 1/32" to 1/64". The coating thickness can be varied according to the desired use of the shoe component, as will be appreciated by those of skill in the art. The coating, which can be applied as a thin layer, is typically tightly bonded to the top surface of the bottom layer 400. Bottom layer 400 comprises the above-described 1,4-poly-butadiene/rubber composition. Other suitable coatings include a mesh of cloth, fiberglass or thin metal, screen of cloth, fiberglass or thin metal, and thin resilient or semi-rigid plastics.

In another embodiment, a coating can be used in combination with a high percentage 1,4-polybutadiene composition. Such a composition can include from 50% up to about 100% 1,4-polybutadiene, with the balance comprising a rubber. In addition to providing compression of a larger area of the composition, and providing faster rebound, the coating also serves to increase the wear resistance of the high percentage 1,4-polybutadiene composition.

In another embodiment, additional layers are placed on top of the 1,4-polybutadiene/rubber composition. Such additional layers may include high energy return rubbers, such as natural rubber, styrene butadiene rubber, neoprene, polyurethane and other resilient materials. Such additional layers function by causing lower layers to more uniformly compress when a force is applied, as described above. Such additional layers can range in thickness from 1/8" to 3/32," although thinner or thicker layers are also within the scope of the invention. For example, the composition includes a layer of styrene butadiene rubber on a layer of natural rubber on the 1,4-polybutadiene/rubber composition. Suitable styrene butadiene rubber include, for example, RUBATEX 8514 and 8515. Similarly, another multi-layer composition can comprise a layer of neoprene superimposed on a 1,4-polybutadiene/natural rubber layer.

Figure 13:
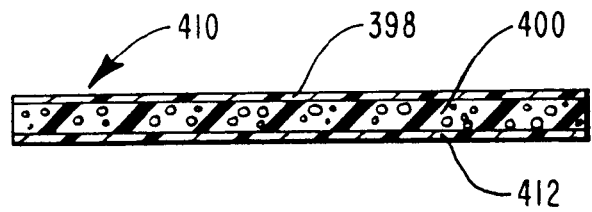
FIG. 13 is a cross-section of another embodiment of a shoe component having upper and lower layers.

Referring to FIG. 13, in another embodiment insole 410 is similar to insole or midsole 390, except a second coating 412 is disposed contiguously with the bottom surface of the layer 400. Layers 398 and 412 can comprise the same materials or different materials. Layers 398 and 412 can have the same or different thicknesses.

When the 1,4-polybutadiene/rubber composition has additional layers or coatings, the resulting shoe component can be a pad placed beneath the ball of a human foot, or a full-length shoe insert. Such pad or insert can be an insole, can be placed under an insole, or as a midsole. For example, a full length shoe component can include a styrene butadiene rubber layer on a layer of natural rubber on a layer of 1,4-polybutadiene/rubber or 1,4-polybutadiene alone. A full length shoe component can also include a natural rubber layer on a layer of 1,4-polybutadiene/rubber or 1,4-polybutadiene alone. In another embodiment, a full length insert can include a layer of styrene butadiene rubber or natural rubber on a layer of 1,4-polybutadiene/rubber or 1,4-polybutadiene alone. This embodiment can further include a layer or coating of natural rubber located between the outer layers and placed beneath the ball portion.

Figure 14:
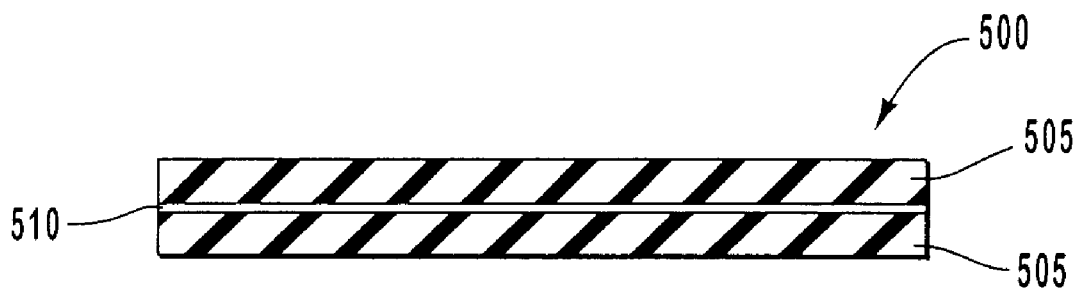
FIG. 14 is a cross-section of a multi-layered embodiment.
Figure 15:
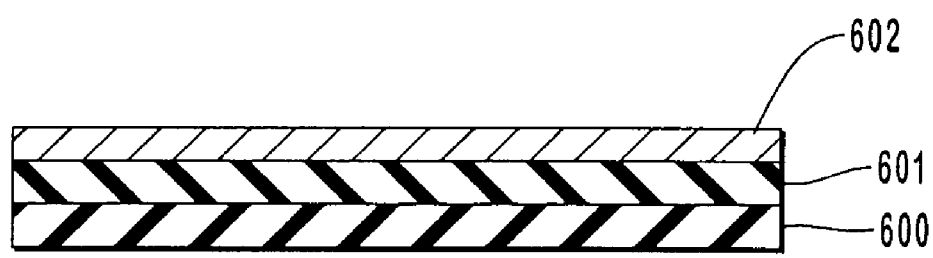
FIG. 15 is a cross-section of another multi-layered embodiment.

Referring to FIG. 14, in another preferred embodiment of the invention, the invented shoe component 500 includes first and second layers of 1,4-polybutadiene/rubber composition 505 separated by a coating 510. The coating 510 can be adhesively attached or bonded to one or both of 1,4- polybutadiene/rubber layers 505. As discussed above, the coating serves to provide more uniform compression of the lower 1,4-polybutadiene/rubber layer. The coating can also serve as a bearing plate to compress the lower layer and provide better rebound for both the lower and upper layers, as described above.

The shoe component can also include two layers of 1,4-polybutadiene/rubber composition, where each layer is less than full length. For example, each layer can be about 80 weight percent very-high cis 1,4-polybutadiene and about 20 weight percent natural rubber. Each layer can be, for example, about 5/64 inches thick. The 1,4-polybutadiene/rubber layers are separated by a coating. The combined pad is preferably inserted into a channel 5/64 inches deep and 3½ inches wide in a 3/16 inch thick pad, such as for example, natural rubber, neoprene (e.g., RUBATEX 8536), or an EVA/natural rubber insole. The channel is formed, for example, by cutting the pad with a sanding disc. In one embodiment, prior to forming the channel, the area of the pad which will be placed beneath the ball of the user's foot is compressed in a hydraulic press for 2–3 seconds to a pressure of about 30 tons. The 1,4-polybutadiene/rubber composition is attached to the neoprene pad by gluing. A layer of elastic fabric (e.g., ribbing) is attached to the pad by gluing with a neoprene-based glue, as discussed below.

Another exemplary embodiment is a 90%/10% 1,4-polybutadiene/natural rubber pad, about 1/16" thick, which has a 1/32" high durometer natural rubber coating bonded to its top surface. The 1,4-polybutadiene/natural rubber mix is typically formed from a recipe comprising 6 lbs of sulfur per 100 lbs of 1,4-polybutadiene and natural rubber. The cross-linked mixture is preferably calendered within one day. The natural rubber coating can be bonded by calendering.

Any of the embodiments can be covered with an elastic fabric such as ribbing, such as for example, an elastic neckband material. The elastic fabric can be attached to an embodiment of the invention using a suitable bonding agent, such as for example, a neoprene-based glue.

Methods for forming shoe components can be selected according to the desired properties of the 1,4-polybutadiene/rubber composition. The following formulae exemplify methods of making shoe components, although the shoe components are not limited by or to these examples.

One substantially solid 1,4-poly-butadiene/rubber composition comprises by weight:

| | |
|---|---|
| Natural Rubber | 40 |
| 1,4-Polybutadiene | 60 |
| (e.g., FIRESTONE DIENE 55NFA or | |
| FIRESTONE DIENE 55AC10 | |
| (90% cis content) | |
| Zinc Oxide | 5 |
| Stearic Acid | 2.5 |
| 2,2'-Dithiobisbenzothiazole | 0.75 |
| Tetramethyl Thiuram Disulfide | 0.4 |

Another substantially solid 1,4-poly-butadiene/rubber composition comprises by weight:

| | |
|---|---|
| Natural Rubber | 25 |
| 1,4-Polybutadiene | 75 |
| (e.g., FIRESTONE DIENE 55NFA or | |
| FIRESTONE DIENE 55AC10 | |
| (90% cis content)) | |
| Zinc Oxide | 5 |
| Stearic Acid | 2.5 |
| 2,2'-Dithiobisbenzothiazole | 0.75 |
| Tetramethyl Thiuram Disulfide | 0.4 |

Another 1,4-polybutadiene/rubber composition comprises by weight:

| | |
|---|---|
| Natural Rubber | 40 |
| High-Cis 1,4-Polybutadiene | 60 |
| (e.g., FIRESTONE DIENE 600, | |
| 635, 645 or 660) | |
| Zinc Oxide | 5 |
| Stearic Acid | 2.5 |
| 2,2'-Dithiobisbenzothiazole | 0.75 |
| Tetramethyl Thiuram Disulfide | 0.4 |

Another 1,4-polybutadiene/rubber composition comprises by weight:

| | |
|---|---|
| Natural Rubber | 40 |
| Very High-Cis 1,4-Polybutadiene | 60 |
| (e.g., Goodyear BUDENE 1207 or 1208.) | |
| Zinc Oxide | 5. |
| Stearic Acid | 2.5 |
| 2,2'-Dithiobisbenzothiazole | 0.75 |
| Tetramethyl Thiuram Disulfide | 0.4 |

Another 1,4-polybutadiene/rubber composition comprises by weight:

| | |
|---|---|
| Natural Rubber | 10 |
| 1,4-Polybutadiene | 90 |
| (KBR01 - 95–98% cis) | |
| Zinc Oxide | 5. |
| Stearic Acid | 2.50 |
| Sulfur | 6 |
| Almax MBS | 1.25 |
| DOTG | 0.75 |
| Agerite Super Lite | 1 |
| Van Fre AP2 | 1.5 |

DOTG and Almax are slower accelerants. The higher amount of zinc oxide adds strength to the invented composition without reducing energy return.

Another 1,4-polybutadiene/rubber composition comprises by weight:

| | |
|---|---|
| Natural Rubber | 10 |
| 1,4-Polybutadiene | 90 |
| (KBR01 - 95–98% cis) | |
| Zinc Oxide | 5 |
| Stearic Acid | 2.5 |
| Sulfur | 6 |
| Almax MBS | 1.25 |
| DOTG | 0.75 |
| Agerite Super Lite | 1 |
| Van Fre AP2 | 1.5 |

Another preferred 1,4-polybutadiene/rubber composition comprises by weight:

| | |
|---|---|
| Natural Rubber | 90 |
| 1,4-Polybutadiene (KBR01) | 10 |
| Zinc Oxide | 5 |
| Stearic Acid | 2.5 |
| Sulfur | 6 |
| Altax/MBTS | 0.75 |
| M. Tuads/TUEX | 0.40 |

Another preferred 1,4-polybutadiene/rubber composition comprises by weight:

| | |
|---|---|
| Natural Rubber | 90 |
| 1,4-Polybutadiene (e.g., FIRESTONE DIENE 55NFA) | 10 |
| Zinc Oxide | 5 |
| Stearic Acid | 2.5 |
| Sulfur | 6 |
| Altax/MBTS | 0.75 |
| M. Tuads/TUEX | 0.4 |

A preferred foam 1,4-polybutadiene/rubber composition comprises by weight:

| | |
|---|---|
| Natural Rubber | 40 |
| 1,4-Polybutadiene (e.g., FIRESTONE DIENE 55NFA or FIRESTONE DIENE 55AC10) | 60 |
| Zinc Oxide | 5 |
| Stearic Acid | 2.5 |
| Sulfur | 2 |
| 2,2'-Dithiobisbenzothiazole | 0.75 |
| Tetramethyl Thiuram Disulfide | 0.4 |
| CELOGEN TO | 0.16 |

Since the several processes by which the 1,4-polybutadiene/rubber composition is manufactured utilize the same or substantially similar pre-mix formulations, the pre-mixing phases will now be described.

1,4-polybutadiene, as a raw material, is commercially available in bales or blocks weighing approximately 70 pounds. The 1,4-polybutadiene is typically softened and masticated (churned or chewed up). Softening and mastication are best accomplished in a commercially-available Banbury mixer where the 1,4-polybutadiene is mixed with a high energy returning rubber such as natural rubber, synthetic isoprene rubber, polyisoprene, butadiene acrylonitrile rubber and ethylene-propylene diene modified rubber. The rubber, in an uncured state, is first placed in the Banbury mixer in solid form, e.g., in 3" solid strips. The 1,4-polybutadiene is then added to the Banbury mixer. For example, the 1,4-polybutadiene can be cut into 3" strips from one or more of the above-mentioned bales. The entire mixture is then cross-cut, chewed up, softened and mixed by the Banbury rollers. After the 1,4-polybutadiene and rubber are sufficiently mixed, this pre-mixed composition has a putty-like consistency.

Cross-linking (curing) is a function of both elevated temperatures and pressure applied to the mix by which the compositions are cured. Cross-linking of the 1,4-polybutadiene and rubber of the pre-mix under high pressure and high temperature produces a durable, high energy return 1,4-polybutadiene/rubber composition having good tensile strength. To accomplish this within commercially acceptable times, certain commercially available and well known additives are introduced into the pre-mix described above. Specifically, commercially-available activating, accelerating, and curing agents are introduced as part of the pre-mix, in a collective amount usually not in excess of 10% by total weight of the 1,4-polybutadiene and the rubber. For example, a sulfur curing agent is acted upon by zinc oxide and stearic acid as activating agents. Examples of suitable accelerators include, but are not limited to, tetramethyl thiuram disulfide, zinc dibutyldithiocarbamate and 2,2'-dithiobisbenzothiazole. The activators and accelerators become active in the process when heat, usually in excess of 300° F. for rapid curing, is applied.

In lieu of a Banbury mixer, the pre-mix can be mixed on a mill. A Banbury mixer, however, is typically quicker (5 to 10 minutes vs. 30 minutes) and is consequently much less expensive. Temperature and pressure may be varied to cure the materials of this invention to provide a high energy return 1,4-poly-butadiene/rubber composition, depending upon time constraints.

Following cross-linking, the mixture is calendered. Calendering is preferably performed within one day of forming the cross-linked mixture.

In one method, the above-described pre-mix (including the curing, activating and accelerating agents) is removed from the Banbury mixer and placed as a layer of desired thickness, usually in excess of ¼", on a commercially-available cold mill. This layered material is then fed from the cold mill into and through a commercially-available calendering mill which has been preheated to 240° F. The calendered material is extruded from the calendar mill rollers at great pressure (e.g., 4,000 psi) to the desired thickness, e.g., 1/16" to 1/8". The material comes out of the calendering mill as a continuous sheet having a predetermined width, e.g., 38", and is continuously wrapped around a storage roller onto cellophane and nylon stripping. The wrapping continues until a roll of suitable length has collected on the storage roller. The roll can be, for example, from 1/16" to ¼" thick, 38" wide, and from 40 to 200 feet long.

The roll is then taken to a pressure-applying autoclave and placed under heat (e.g., 307° F.) and pressure (e.g., 60 psi), for 4–5 hours to cure the roll. The heat and pressure cause the cellophane to contract around the roll. Afterwards the stripping is removed, and the cured high strength, high energy return material is re-rolled and placed in inventory.

In another method, a foam or substantially solid 1,4-polybutadiene/rubber composition is formed according to the following steps. For a substantially solid composition, the skilled artisan will appreciate that the gas entrainment additive is omitted. For a foam composition, a suitable gas entrainment additive (foaming agent), such as 80% CELOGEN OT (generically referred to as p,p'-oxybisbenzene sulfonyl hydrazide, OBSH) (Uniroyal Chemical Company) or 800 GWP Master Mix (Master Processing, 2500 Thompson Street, Long Beach, Calif., 90801) is added to the pre-mix in amounts, for example, of 0.30 pounds per 188.8 pounds of premix or 11.0 pounds per 188.8 pounds of premix, respectively. The pre-mix is further mixed and layered to a desired pre-cured thickness in a cold mill. The desired pre-cured thickness will be slightly greater than the desired cured thickness, e.g., 5/16" and ¼", respectively.

The sheet material obtained from the cold mill is cut into individual pieces sized to fit into a steel tray. An 18"×18" tray is satisfactory. The tray, carrying the sized material, is placed into a commercial hydraulic heat press and subjected to a continuing high temperature, e.g., within the range of 310–320° F., under a uniformly applied press-imposed pressure, e.g., about 2000 psi, for about 20–30 minutes. The substantially solid 1,4-polybutadiene/rubber composition requires 10 minutes. The fully cured tray-carried material is then removed from the heat press and placed in inventory, ready to be cut into shoe components.

In another method, a commercial Rotocure (heated mills placed in series) is preheated, e.g., to about 310° F. The above-described pre-mix is fed into and through the Rotocure unit as a continuous layer or belt, where the heat (of about 310° F.) and the roller pressure (of about 4000 psi or more) are applied as the belt of pre-mix is displaced therethrough. A continuous sheet of cured material issues from the Rotocure for placement in inventory, ready to be cut into shoe components.

In another method, the pre-mix wrapped in fabric and cured in an autoclave, such as, for example, for 4 hours at 260° F. Following autoclaving, the fabric is removed from the material. If necessary, the fabric is removed after passing the material through a conveyor oven (e.g., at 1000° F.). To improve the energy return of the material, it can be further cured in an oven for about 2.5 hours at about 325° F. The cured material can also be further cured in a microwave oven, such as, for example, for about 4–6 minutes on a rotating tray.

While the foam and substantially solid 1,4-polybutadiene/rubber compositions described above have been correlated to shoe components, it is to be appreciated that these materials have application to other areas, such as gymnastics and basketball floors, and artificial football fields.

In other preferred embodiments of the method, a pre-mix of the 1,4-polybutadiene/rubber composition can be encapsulated in the sole of a shoe before vulcanization, as is known to those of skill in the art.

Energy Return

In a preferred embodiment, the shoe component maximizes the performance of the wearer. For example, a measure of performance is energy return. The energy return can be measured as Bashore Resilience by vertical rebound (ASTM D2632) using a button of the test material. Another measure of energy return is rebound height after dropping a super heavy basketball (about 5 pounds) on a test sample.

In some embodiments, other materials can be included in the shoe component to provide additional features including, but not limited to, color, textures, added structural integrity and wear resistance. Such materials typically do not decrease the energy return of the composition. In a preferred embodiment, the composition is substantially free of fillers (non-energy returning materials) which reduce the energy return of the shoe component. Such fillers include materials such as calcium carbonate, furnace black, pine tar, clays and silicas. Low energy return plastics and rubbers, such as 1,2-polybutadiene, are also preferably excluded from the 1,4-polybutadiene/rubber composition for the same reasons. In a preferred embodiment, the energy return provided by the composition is at least about 50%, more typically at least about 65% and up to about 80% or more.

Comparative testing reveals that the instant invention provides substantially greater energy return than prior shoe components. Referring to Table 2, conventional EVA insoles (Comparative Example 1) produce a 12% energy return. When a layer of conventional shoe fabric is placed on top of an EVA insole, the energy return of the shoe component decreases (Comparative Example 2). In contrast, a foam 1,4-polybutadiene/rubber composition, having about 60 weight percent 1,4-polybutadiene (about 90% cis content) and about 40 weight percent natural rubber, provides about 47% energy return (Example 3). A substantially solid 1,4-polybutadiene/rubber composition, of about 60 weight percent 1,4-polybutadiene (about 90% cis content) and about 40 weight percent natural rubber, provides increased energy return of about 67% (Example 4). Example 5 shows that the combination of a substantially solid 1,4-polybutadiene/rubber composition with a layer of conventional shoe fabric on top is within the scope of the invention. Although the shoe fabric can act to somewhat reduce the energy return (compare Examples 4 and 5), substantial energy return is still conferred by this embodiment of the invention. When non-energy returning materials, such as pine tar and furnace black, are included in the composition, the energy return is substantially reduced (compare Examples 4 and 9).

Example 6 shows that the energy return of the foam 1,4-polybutadiene/rubber composition of Example 3 can be increased from about 47% to about 53% by adding a thin coating of hard polyurethane to the top or bottom of the 1,4-polybutadiene/rubber composition. Example 7 shows an increase in energy return from a substantially solid 1,4-polybutadiene/rubber composition comprising about 60 weight percent high-cis 1,4-polybutadiene and about 40 weight percent natural rubber. This embodiment of the invention yields increased energy return of 73%. Example 8 shows that the energy return is further increased by replacing the high-cis 1,4 polybutadiene with a very high-cis 1,4-polybutadiene.

Enhancement of Athletic Performance

Experimentation with various configurations and embodiments demonstrates that an improvement in energy return, and athletic performance, is experienced by athletes using the 1,4-polybutadiene/rubber composition. More specifically, the length of stride on the first stride and successive strides in running, the jumping ability of a basketball player, and any combination of vertical and horizontal self-displacement by the user are enhanced. Several different measures of athletic performance were used to quantitate the improvement in athletic performance by shoe components comprising the 1,4-polybutadiene/rubber composition.

Study I: Double Blind Speed Study

In a double-blind speed study, thirty-one (31) athletes were speed tested for distances of 10, 20, 30 or 40 meters (M). A moleskin placebo or a substantially solid 1,4-polybutadiene/rubber insert (5/64 inches thick) was placed under the ball of the foot beneath the insole of the athlete's track spikes or running flats. The participating athletes were not informed that either the placebo or the insert could increase athletic performance. The 1,4-polybutadiene/rubber composition comprised about 60 weight percent 1,4-polybutadiene (about 90% cis content) and about 40 weight percent natural rubber. The athletes were members of either university track, baseball and football teams or national track or soccer teams. For each athlete, one to four time trials were conducted over a one or two day period. The athletes were tested on both outdoor and rubberized tracks. The speed improvements of the athletes, as measured in seconds, are shown in Table 3.

Example 1 shows the speed improvements of athletes for a distance of 40 meters while wearing running spikes. From a standing start, the athletes' times were measured at 10 and 40 meters. The time difference between 10 and 40 meters was used to compute the time the athletes took to traverse the intermediate 30 meters. As shown in Example 1, when the athletes wore running spikes containing a shoe component according to the invention, their average improvement was about 1.57–1.59%, and the speed improvement was nearly constant throughout the 40 meter distance.

Example 2 shows speed improvements of athletes for a distance of 20 meters while wearing running flats. From a standing start, the athletes' times were measured at 10 and 20 meters. The time difference between 10 and 20 meters was used to compute the time the athletes took to traverse the second 10 meters. As shown in Example 2, the average speed improvement of the athletes was greater for the second 10 meters as compared with the first 10 meters (0.61% vs 1.58%; compare 2a and 2b). The speed improvement of the athletes was less pronounced during their initial acceleration than once they had reached full stride. The average improvement for the second 10 meters, of about 1.58%, was very similar to the average speed improvement observed in Example 1a–c, and indicates that the speed improvement can be independent of the shoe type.

Example 3 shows the speed improvements of athletes wearing running spikes. From a standing start, the athletes' times were measured for a distance of 20 meters. The observed average speed improvement of 1.36% is very similar to the speed improvements of the athletes in Example 1 and Example 2b.

Of the athletes tested in Examples 1–3, twenty-six (26) ran significantly faster, two (2) ran slower and three (3) ran statistically the same. This study also showed that athletes wearing both track spikes and running flats can experience improved athletic performance.

Study II: Seasonal Performance Testing

A seasonal study of fourteen (14) members of university track teams was conducted to evaluate the performance of athletes with and without a 1,4-polybutadiene/rubber composition as an insert. The 1,4-polybutadiene/rubber insert (5/64" thick) comprised 60 weight percent 1,4-polybutadiene (about 90% cis content) and 40 weight percent natural rubber, and was built into the athletes' meet spikes below the ball of the foot under the insole. The athletes were divided into two groups. The average and best performances of these athletes are shown in Tables 4 and 5, respectively.

For Group 1, the average and best athletic performances of eight (8) sprinters (100 to 400 meter runs and intermediate hurdle events) were monitored for a nine week period without the invented insert, and for a three week period with the invented insert, in their meet spikes. Seven (7) of the eight (8) athletes showed improved average and best performances with the present invention in their shoes. The average improvement for this group was 1.49%.

For Group II, the average and best athletic performances of six (6) middle-distance runners (800 and 1500 meters runs) were monitored for a two month period without the insert, or a one month period with the insert, in their meet spikes. All six (6) athletes showed improved average and best performances with the insert in their shoes. The average improvement for the middle-distance runners was 1.48%.

Thus, thirteen of fourteen athletes participating in this study showed an average performance improvement of 1.48–1.49% using the present invention. This performance improvement is very similar to the performance improvement of the athletes shown in the double blind speed study (Study I.) of 1.36–1.59%. In contrast, sixty (60) percent of athletes (50 athletes in 42 of 70 events) in a control group (without the insert) showed no improvement in athletic performance over the same time period.

Study III: Two Leg Double Bound Tests

A two leg double bound test was conducted on 35 members of university volleyball, baseball and track teams. The distances the athletes could jump, from a standing start, in two sequential jumps was measured with and without an insert inserted in the athletes' shoes. The insert comprised 60 weight percent 1,4-polybutadiene (about 90% cis content) and 40 weight percent natural rubber; the insert was placed in the athletes' shoes below the ball of the foot under the insole. These athletes were able to jump an average of 2½, 2½ and 5 inches farther, respectively, when the invented insert was used. The range of improvements was from −2" to 14", when the invented insert was used.

Study IV: Two Leg Double Bound Tests

A two leg double bound test was also conducted using an insert comprising 60 weight percent high-cis 1,4-polybutadiene and 40 weight percent natural rubber in the form of an insert placed in the athletes' shoes below the ball of the foot under the insole. Of twelve (12) members of a division 1 university basketball team, all jumped farther with the insert placed in the shoe. The average improvement in distance was 5.6 inches. The range of improvements was from 1 to 12 inches.

Fourteen (14) members of a high school varsity volleyball team were also tested. All fourteen athletes jumped farther with the insert in their shoe. The average improvement was 8.6 inches, when the insert was used. The range of improvements was from 3½ to 14 inches, when the insert was used.

Study V: Two Leg Double Bound and Vertical Jump Tests

A two leg double test of university high jumpers and triple jumpers, track and basketball players and volleyball players was conducted using an insert of 60 weight percent very high-cis 1,4-polybutadiene and 40 weight percent natural rubber in the form of an insert placed in the athletes' shoes below the ball of the foot under the insole. Of five (5) high and triple jumpers, the improvement in the length of the double bound jump ranged from 5 to 15 inches, with an average increase of about 9.6 inches. Similarly, four (4) members of the same group showed an increase in the height of a vertical jump ranging from 1.5 to 4.5 inches, with an average of about 2.8 inches.

Twelve (12) members of a university track and basketball teams were also tested. Of the twelve (12) athletes participating in the double bound test, the increases in jump length ranged from 4.5 to 12 inches, with an average increase of about 7.8 inches. Of the four (4) athletes participating in the vertical jump test, the increases in jump height ranged from 3–4 inches, with an average increase of about 3.25 inches.

Eight (8) members of a university men's volleyball team were similarly tested. The athletes showed an increase in the jump length of the double bound test ranging from 2 to 14 inches, with an average of about 8 inches. Of the four (4) athletes participating in the vertical jump test, the increase in jump height ranged from −1 to 3 inches, with an average increase of about 1.9 inches.

Study VI: Biceps Strength

Biceps strength was measured using a Cypex testing machine. The test subject was wearing running shoes. Bicep strength was measured with or without a shoe component comprising a full length insole of about 75 weight percent 98% cis 1,4-polybutadiene and about 25 weight percent natural rubber. Without the shoe component, the peak bicep pull was 187 foot pounds. With the shoe component inserted under subject's foot, the peak bicep pull was 221 foot pounds. Thus, the wearer's upper arm strength increased when wearing an insole.

Study VII. Total Peak Work Measurement

Total peak work of a test subject was measured using a Cypex testing machine, without or without the shoe component described in Study VI in the subject's athletic shoes. Without the shoe component, the peak work was 202 foot pounds. With the shoe component in the subject's shoes, the peak work was 252 foot pounds.

Study VIII. Heart Performance

An acoustical cardiogram was used to monitor the heart sounds of a test subject with or without the shoe component of Study VI in the subject's shoes. When the shoe components were inserted into the subject's shoes, the acoustical cardiogram revealed fewer fibrillation between heart beats.

Study IX. Leg/Arm/Torso Strength test

Seven subjects from a university were tested for leg/arm/torso strength in a performance laboratory. All subjects were tested on a force plate for strength in the "Y" or lateral plane and the "Z" or downward plane. A total of 19 trials each were run with and without an invented composition in the subjects' shoes. Springsoles, comprising about 75 weight percent 98% cis 1,4-polybutadiene and about 25 weight percent natural rubber, were placed in the subjects' shoes.

Test No. 1 was a lateral push from the side after subjects bent their knees and put their weight down on their thighs. The purpose of this test was to determine leg and torso strength by measuring, on the force plate, a) lateral pushing force, b) the duration time of the force; and c) the amount of time it took to push the subject off the force plate.

Referring to Table 6, the following data were compiled by analyzing each individual push in increments of 1/200 of a second. As can be seen from this data, with springsoles, the subjects' exhibit greater average pushing force, greater average duration time that the pushing force was applied, and resistance to a force. Thus, the subjects' legs and torso were strengthened.

Test No. 2. The same subjects were tested for arm strength. All were tested on a force plate for strength in the "Z" or downward plane. A total of 18 trials each were run with and without springsoles. The arm test was conducted by having each subject extend their arms outward to the side of their body. A downward force was then applied at the wrist as the subject offered resistance against the downward pull. An adjustment was made, using from one finger to the full hand, to pull down the subject's arm, depending on size, gender and strength of the subjects. The test measured arm strength by measuring on the force plate a) vertical push force, and b) the duration time of the force.

Referring to Table 7, the data was compiled by analyzing each individual push in increments of 1/100 of a second. As can be seen from that data, subjects wearing the springsoles in their shoes demonstrated increased resistance to a force applied to the arms, indicating that the subjects' arm strength was increased by wearing the springsoles.

TABLE 1

Shoe Components

| Example | Shoe Component | 1,4-Polybutadiene (weight percent) | Rubber (weight percent) |
|---|---|---|---|
| 1 | solid sole | 46% 1,4-polybutadiene | 54% polyisoprene |
| 2 | foam insole | 50% 1,4-polybutadiene | 50% acrylonitrile butadiene |
| 3 | solid midsole | 54% 1,4-polybutadiene (high-cis) | 45% ethylene propylene diene modified rubber |
| 4 | foam insole | 75% 1,4-polybutadiene | 25% synthetic isoprene |
| 5 | solid insole | 70% 1,4-polybutadiene (high-cis) | 30% synthetic isoprene |
| 6 | foam midsole | 95% 1,4-polybutadiene | 5% natural rubber |
| 7 | foam insole | 70% 1,4-polybutadiene (high-cis) | 30% acrylonitrile butadiene |
| 8 | solid insole | 60% 1,4-polybutadiene | 40% natural rubber |
| 9 | solid insole | 60% 1,4-polybutadiene (high-cis) | 40% natural rubber |
| 10 | solid insole | 95% 1,4-polybutadiene | 5% polyisoprene |
| 11 | solid insole | 60% 1,4-polybutadiene (very high-cis) | 40% natural rubber |
| 12 | solid midsole | 70% 1,4-polybutadiene (very high-cis) | 30% natural rubber |
| 13 | solid insole | 75% 1,4-polybutadiene (very high-cis) | 25% natural rubber |
| 14 | solid midsole | 50% 1,4-polybutadiene (very high-cis) | 50% natural rubber |
| 15 | solid insole | 100% 1,4 polybutadiene (very high-cis) | n/a |

TABLE 2

Energy Return

| Example | Composition (Weight Percentage) | Energy Return |
|---|---|---|
| Comparative Example 1 | EVA sponge rubber insole with shoe fabric removed | 12% |
| Comparative Example 2 | EVA sponge rubber insole with shoe fabric on top | 10% |
| 3 | foam 1,4-polybutadiene/rubber composition (60% 1,4-polybutadiene (90% cis), 40% natural rubber with a foaming agent) | 47% |
| 4 | substantially solid 1,4-polybutadiene/-rubber composition (60% 1,4-polybutadiene (90% cis), 40% natural rubber) | 67% |
| 5 | substantially solid 1,4-polybutadiene/-rubber composition with shoe fabric on top (60% 1,4-polybutadiene (90% cis), 40% natural rubber) | 56% |
| 6 | foam 1,4-polybutadiene/rubber composition with 1/16" of polyurethane coating (60% 1,4-polybutadiene (90% cis), 40% natural rubber) | 53% |
| 7 | substantially solid 1,4-polybutadiene/-rubber composition (60% 1,4-polybutadiene (95% cis), 40% natural rubber) | 73% |
| 8 | substantially solid 1,4-polybutadiene/-rubber composition (60% 1,4-polybutadiene (98% cis), 40% natural rubber) | 75% |
| Comparative Example 9 | Composition of Example 4 with one-third by total weight of rubber furnace black and pine tar. | 45% |

TABLE 3

Double Blind Speed Study

| Example | Number of Athletes | Shoes | Distance | Average Improvement | Comments |
|---|---|---|---|---|---|
| 1a | 14 | Track Spikes | 10 M | 0.0224 seconds (1.58%) | First 10 M |
| b | 14 | " | 30 M | 0.0505 seconds (1.57%) | Second 30 M |
| c | 14 | " | 40 M | 0.0729 seconds (1.57%) | Total Distance |

TABLE 3-continued

Double Blind Speed Study

| Example | Number of Athletes | Shoes | Distance | Average Improvement | Comments |
|---|---|---|---|---|---|
| 2a | 14 | Running Flats | 10 M | 0.0108 seconds (0.61%) | First 10 M |
| b | 11 | " | 10 M | 0.0198 seconds (1.58%) | Second 10 M |
| c | 11 | " | 20 M | 0.0275 seconds (0.88%) | Total Distance |
| 3 | 3 | Track Spikes | 20 M | 0.0357 seconds (1.36%) | Total Distance |

TABLE 4

Average Seasonal Improvement

| Example | Event | Average without pad* | Average with pad* | Average Improvement |
|---|---|---|---|---|
| Group 1 | | | | |
| A. | 400 M Run | 48.30 (1) | 47.59 (3) | 0.71 seconds |
|  |  | 46.81 (5) | 46.03 (2) | 0.78 seconds |
|  |  | 48.35 (5) | 47.27 (4) | 1.08 seconds |
| B. | 400 M Hurdles | 52.17 (6) | 50.59 (3) | 1.58 seconds |
| C. | 200 M Run | 21.94 (1) | 21.49 (2) | 0.45 seconds |
|  |  | 20.97 (1) | 20.8 (1) | 0.17 seconds |
|  |  | 21.60 (1) | 21.38 (2) | 0.22 seconds |
|  |  | 21.54 (1) | 21.27 (1) | 0.27 seconds |
| D. | 110 M Hurdles | 14.51 (3) | 14.29 (4) | 0.22 seconds |
|  |  | 14.14 (8) | 13.91 (2) | 0.23 seconds |
| E. | 100 M Run | 10.66 (4) | 10.73 (6) | −0.07 seconds |
| F. | Long Jump | 22'10" (5) | 23'4" (5) | 6" farther |
| Group II. | | | | |
| G. | 1500 M Run | 357.56 (4) | 354.15 (2) | 3.41 seconds |
|  |  | 358.24 (3) | 355.27 (2) | 2.97 seconds |
|  |  | 357.60 (3) | 355.85 (2) | 1.75 seconds |
| H. | 800 M Run | 154.51 (1) | 153.50 (3) | 1.01 seconds |
|  |  | 153.40 (3) | 151.93 (4) | 1.47 seconds |
|  |  | 156.94 (4) | 154.00 (4) | 2.94 seconds |

*The average improvement for all examples except F is given in seconds. The number of trials used to compute the average is shown in parentheses.

TABLE 5

Best Seasonal Performance

| Example | Event | Average without pad* | Average with pad* | Average Improvement |
|---|---|---|---|---|
| Group 1 | | | | |
| A. | 400 M Run | 48.30 (1) | 47.34 (3) | 0.96 seconds |
|  |  | 45.82 (5) | 45.96 (2) | −0.14 seconds |
|  |  | 47.81 (5) | 47.03 (4) | 0.78 seconds |
| B. | 400 M Hurdles | 51.41 (6) | 50.45 (3) | 0.96 seconds |
| C. | 200 M Run | 21.94 (1) | 21.38 (2) | 0.56 seconds |
|  |  | 20.97 (1) | 20.8 (1) | 0.17 seconds |
|  |  | 21.60 (1) | 21.31 (2) | 0.29 seconds |
|  |  | 21.54 (1) | 21.27 (1) | 0.27 seconds |
| D. | 110 M Hurdles | 14.38 (3) | 14.17 (4) | 0.21 seconds |
|  |  | 13.91 (8) | 13.88 (2) | 0.03 seconds |
| E. | 100 M Run | 10.56 (4) | 10.54 (6) | 0.02 seconds |
| F. | Long Jump | 24'1" (5) | 24'1" (5) | — |
| Group II. | | | | |
| G. | 1500 M Run | 356.33 (4) | 351.93 (2) | 4.41 seconds |
|  |  | 357.94 (3) | 353.83 (2) | 4.11 seconds |
|  |  | 356.33 (3) | 351.06 (2) | 5.27 seconds |
| H. | 800 M Run | 154.51 (1) | 152.86 (3) | 1.65 seconds |
|  |  | 151.93 (3) | 150.60 (4) | 1.33 seconds |
|  |  | 154.96 (4) | 152.92 (4) | 2.04 seconds |

*The average improvement for all examples except F is given in seconds. The number of trials from which the best performance was selected is shown in parentheses.

TABLE 6

Leg/Torso Strength

| Subject | Average Lbs. of Pushing Force (3 Trials each subject, unless otherwise noted with an asterisk) | Average Duration of Time (in 1/100 of a second) that Pushing Force was Applied | Average Time (in 1/100 of a second) that Subject was Able to Remain on Force Plate |
|---|---|---|---|
| WITHOUT SPRINGSOLES | | | |
| Subject 1 | 55.9 | 0.30 | 0.53 |
| Subject 2* | 68.6 | 0.44 | 0.95 |
| Subject 3 | 65.6 | 0.29 | 0.84 |
| Subject 4* | 64.7 | 0.44 | 0.96 |
| Subject 5 | 101.6 | 0.41 | 1.08 |
| Subject 6 | 58.3 | 0.35 | 1.00 |
| Subject 7 | 81.2 | 0.40 | 1.15 |
| Average of All Subjects: | 71.4 | 0.37 | 0.93 |
| WITHOUT SPRINGSOLES | Force/Lbs. per second 71.4 × 0.37 Force = 26.4 | | |
| WITH SPRINGSOLES | | | |
| Subject 1 | 68.2 | 0.62 | 0.86 |
| Subject 2 | 87.0 | 0.63 | 1.25 |
| Subject 3 | 90.0 | 0.43 | 0.96 |
| Subject 4 | 83.2 | 0.78 | 1.18 |
| Subject 5 | 118.6 | 1.16 | 2.07 |
| Subject 6 | 67.8 | 0.73 | 1.30 |
| Subject 7 | 85.3 | 0.60 | 1.18 |
| Average of All Subjects: | 85.8 | 0.71 | 1.25 |
| WITH SPRINGSOLES | Force/Lbs. per second 85.3 × 0.71 Force = 61.0 | | 34% More Time on Force Plate with Springsoles |

NOTE:
*Two trials per subject.

TABLE 7

Arm Strength

| Subject | WITHOUT SPRINGSOLES | | Subject | WITH SPRINGSOLES | |
| --- | --- | --- | --- | --- | --- |
| | Average Lbs. of Pulling Force (3 Trials each subject, unless otherwise noted with an asterisk) | Average Time (in 1/100 of a second) that Force was Applied to Arm of Subject before Arm Came Down | | Average Lbs. of Pulling Force (3 Trials each subject, unless otherwise noted with an asterisk) | Average Time (in 1/100 of a second) that Force was Applied to Arm of Subject |
| Subject 1 | 174.0 | 0.89 | Subject 1 | 171.6 | 1.85 |
| Subject 2 | 191.6 | 0.70 | Subject 2 | 189.0 | 1.31 |
| Subject 3 | 324.3 | 1.41 | Subject 3 | 332.0 | 1.82 |
| Subject 4* | 200.0 | 0.94 | Subject 4 | 197.0 | 1.62 |
| Subject 5 | 162.3 | 0.44 | Subject 5 | 164.0 | 1.00 |
| Subject 6* | 165.0 | 0.49 | Subject 6 | 166.0 | 1.08 |
| Subject 7 | 130.0 | 0.55 | Subject 7 | 130.6 | 1.31 |
| Average of All Subjects: | 195.0 | 0.79 | Average of All Subjects: | 196.0 | 1.45 |
| WITHOUT SPRINGSOLES | With an Average of the same Force Applied | In 18 Trials, every arm came down to the subject's side. | WITH SPRINGSOLES | With an Average of the same Force Applied | In 18 trials, not one arm came down. |

NOTE:
*Fewer than 3 trials per subject.

SUMMARY

In summary, subjects using shoe components comprising a 1,4-polybutadiene/rubber composition experienced unexpected increases in athletic performance. Most athletes experienced increased faster running times of up to about 1.6%, and further speed increases are contemplated with regular use of the shoe components. Similarly, most athletes were able to jump farther. The shoe components also increased upper body strength, increased resistance to lateral forces, and improved heart performance.

While the present invention has been described and illustrated in conjunction with a number of specific embodiments, those skilled in the art will appreciate that variations and modifications may be made without departing from the principles of the invention as herein illustrated, described and claimed. The invention may be embodied in other specific forms without departing from the spirit or essential characteristics thereof. The present embodiments are to be considered in all respects as illustrative, and not restrictive. The scope of the invention, is therefore, indicated by the appended claims rather than by the foregoing description, and all changes which come within the meaning and range of equivalency of the claims are to be embraced within their scope.

I claim:

1. A performance-enhancing shoe component, comprising:
   (a) a first layer shaped for placement within a shoe, the layer having upper and lower surfaces, the first layer comprising a cured mix of:
      (i) 1,4-polybutadiene having a cis content of at least about 90%, the amount of the 1,4-polybutadiene ranging from greater than about 46 to about 95 weight percent, and
      (ii) rubber selected from the group consisting of natural rubber, synthetic isoprene rubber and polyisoprene, the amount of the rubber ranging from less than about 54 to about 5 weight percent;
   wherein the weight percentages are based on the total weight of the 1,4-polybutadiene and the rubber;
   the layer is substantially free of fillers and non-energy-returning rubbers which reduce energy return;
   the first layer provides at least 47% energy return, and the upper surface has surface texture to increase the energy return of the layer.

2. The shoe component according to claim 1, wherein the cured mix is substantially solid and substantially free of trapped gas.

3. The shoe component according to claim 1, wherein the rubber in the first layer is natural rubber.

4. The shoe component according to claim 1, wherein the first layer comprises 95 weight percent 1,4-polybutadiene.

5. The shoe component according to claim 1, wherein the 1,4-polybutadiene is very high-cis 1,4-polybutadiene having a cis content of at least about 98%.

6. The shoe component according to claim 1, further comprising;
   an energy returning layer comprising an energy returning rubber disposed on the first layer.

7. The shoe component according to claim 6, wherein the energy returning rubber is neoprene, natural rubber or a 1,4-polybutadiene/natural rubber mix.

8. The shoe component according to claim 1, wherein the first layer extends substantially the length of the shoe.

9. The shoe component according to claim 1, wherein the first layer is an insole, a midsole, an insert or a portion thereof.

10. A method of improving a person's exercise performance, comprising placing shoes on the feet of the person, each shoe comprising a first layer as recited in claim 1, and performing an exercise by exerting and releasing force on said first layer, wherein the feet of the person exert a force on the first layers, thereby compressing the first layers, and, upon release of the force, the first layers rebound, thereby increasing the person's exercise performance relative to exercise performance without said first layer.

11. A method of improving performance of a person during exercise, wherein the person is:
   wearing shoes, each shoe having a shaped layer comprising a cured mix of:
      (i) 1,4-polybutadiene having a cis content of at least about 90%, the amount of the 1,4-polybutadiene ranging from greater than about 46 to about 95 weight percent; and (ii) rubber selected from the group consisting of natural rubber, synthetic isoprene rubber and polyisoprene, the amount of the rubber ranging from less than about 54 to about 5 weight percent;

wherein the weight percentages are based on the total weight of the 1,4-polybutadiene and the rubber; the cured mix being substantially free of fillers and non-energy-returning rubbers which reduce energy return; and performing an exercise by exerting and releasing force on said shaped layer wherein a foot of the person exerts a force on the shaped layer to compress the shaped layer, and, upon release of the force, the shaped layer rebounds, providing energy return to the foot of the person;

whereby the person's performance during said exercise is improved relative to exercise performance without said shaped layer.

12. The method of claim 11, wherein the exercise is walking, running, jumping, weight lifting, broad jumping, high jumping, volleyball, basketball, football or soccer.

13. The method of claim 11, wherein the improvement in performance during said exercise is a reduction in fibrillation of the person's heart.

14. The method of claim 11, wherein the improvement in performance during said exercise is increasing the strength of the person.

15. The method of claim 11, wherein the improvement in performance during said exercise is increasing the arm strength of the person.

16. The method of claim 11, wherein the improvement in performance during said exercise is running faster.

17. The method of claim 11, wherein the improvement in performance during said exercise is jumping higher or farther.

18. The method of claim 11, wherein the improvement in performance during said exercise is walking faster.

19. The method of claim 11, wherein the improvement in performance during said exercise is less exertion by the person.

20. The method of claim 11, wherein the improvement in performance during said exercise is greater resistance to movement from a stationary position.

21. The method of claim 11, wherein the shoes are athletic shoes, dress shoes, casual shoes, walking shoes, or sandals.

* * * * *